United States Patent [19]

Mattila et al.

[11] Patent Number: 5,728,263
[45] Date of Patent: Mar. 17, 1998

[54] METHOD FOR INHIBITING ENZYMATIC DECOMPOSITION OF PEROXIDE IN THE TREATING OF FIBER PULP USING DIALDEHYDES AND ACETALS

[75] Inventors: Pertti Mattila, Kouvola, Finland; Dieter Zeller, Wiesloch, Germany

[73] Assignee: Cellkem OY, Kouvola, Finland

[21] Appl. No.: 564,176

[22] PCT Filed: Jun. 15, 1994

[86] PCT No.: PCT/FI94/00256

§ 371 Date: Apr. 9, 1996

§ 102(e) Date: Apr. 9, 1996

[87] PCT Pub. No.: WO95/00439

PCT Pub. Date: Jan. 5, 1995

[30] Foreign Application Priority Data

Jun. 17, 1919 [FI] Finland .................................. 932814

[51] Int. Cl.[6] .................................. D21C 5/02
[52] U.S. Cl. .................................. 162/5; 162/76; 162/78
[58] Field of Search .................................. 162/4, 5, 78, 76

[56] References Cited

U.S. PATENT DOCUMENTS 2,676,871  4/1954  McGovern .................................. 8/111
4,844,886  7/1989  Hartmann et al. .................................. 424/62
4,875,973  10/1989  Heikkila et al. .................................. 156/664

FOREIGN PATENT DOCUMENTS 931322    4/1993   Finland .
1682432   10/1991  U.S.S.R. .
2 265 392  9/1993   United Kingdom .

OTHER PUBLICATIONS

Zakatov, A.N., "Means of increasing . . . Mech Pulp", May 1990, Abstract.

Singh, Devendra Deo Narain, "Preparation of . . . base alloys" Feb. 1989, Abstract.

Primary Examiner—Donald E. Czaja
Assistant Examiner—Dean T. Nguyen
Attorney, Agent, or Firm—Burns, Doane, Swecker & Mathis, L.L.P.

[57] ABSTRACT

The invention relates to the use of dialdehydes and acetals thereof for inhibiting decomposition of peroxide in the production and the treatment of recycled fiber pulp and other fiber pulp.

12 Claims, 3 Drawing Sheets

METHOD FOR INHIBITING ENZYMATIC DECOMPOSITION OF PEROXIDE IN THE TREATING OF FIBER PULP USING DIALDEHYDES AND ACETALS

FIELD OF THE INVENTION

The invention relates to the use of dialdehydes and acetals thereof for inhibiting decomposition of peroxide in the production and the treatment of recycled fiber pulp and other fiber pulp.

BACKGROUND OF THE INVENTION

Hydrogen peroxide is used in the production of recycled fiber pulp and other fiber pulp to enhance brightness. On account of its highly oxidizing effect, hydrogen peroxide has also been used with varying success for destroying bacteria. The effect of hydrogen peroxide is reduced by certain metal ions that are present in water. To obviate this problem, chelate formers have been used for binding the metal ions. Another difficult problem is the decomposition of peroxide for other reasons, e.g. because of the effect of peroxide-decomposing enzymes. These enzymes are produced by microbial action. One of such enzymes is catalase, one molecule of which decomposes 40 000 peroxide molecules at the temperature of 0° C. in one second (the Encyclopedia of Biochemistry, Roger J. Williams, Edwin M. Lansford Jr., page 634).

It has now been unexpectedly found that the use of dialdehydes or acetals thereof in the production and treatment of recycled fiber pulp and other fiber pulp renders it possible to inhibit and control enzymatic decomposition of peroxide. This is advantageous not only in view of brightness but also in view of control of microbes, as in this way the effect of residual peroxide, which also destroys bacteria, occurs more widely in the process. The invention opens new prospects for control and management of process chemistry, as one factor which has so far been uncontrollable can now be eliminated.

SUMMARY OF THE INVENTION

The invention relates thus to the use of dialdehydes and acetals thereof for inhibiting decomposition of peroxide in the production and the treatment of recycled fiber pulp and other fiber pulp.

Suitable dialdehydes are straight-chain and cyclic aliphatic dialdehydes which contain preferably 2 to 8 carbon atoms and which may be C-substituted and contain heteroatoms, such as glyoxal, succinic aldehyde, glutaraldehyde, methyl-glutaraldehyde, octanediale and oxa-glutaraldehyde. Other suitable dialdehydes are aromatic dialdehydes which contain preferably 6 carbon atoms and which may be substituted and contain heteroatoms, such as o-phthalic aldehyde, m-phthalic aldehyde and p-phthalic aldehyde.

Suitable acetals of dialdehydes, including semiacetals, are those where the alcoholic component of the acetal is a primary, secondary or tertiary alcohol, such as carbohydrate, e.g. glucose. Specific examples of acetals are those having the formulae

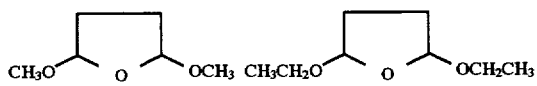

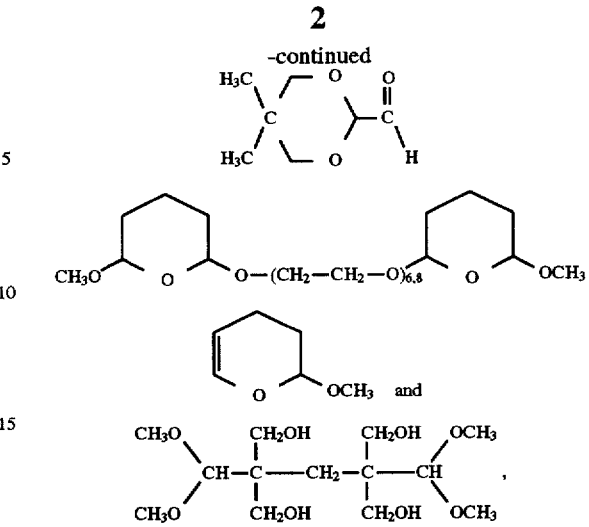

and 1,6-dihydroxy-2,5-dioxa-hexane.

According to the invention, it is possible to use either a single dialdehyde or acetal or a mixture of two or more dialdehydes or acetals.

The amount of the dialdehyde or acetal used may vary over a wide range depending on the process that is employed. The amount is, however, typically 0.5 to 250 ppm, preferably 2 to 75 ppm, specifically 15 to 50 ppm, based on weight. As the processes are rather different, the amount of the dialdehyde or acetal can also be indicated as follows: typically 0.05 to 2 kg, preferably 0.1 to 1 kg, specifically 0.2 to 0.6 kg, per one ton of produced fiber pulp (dry matter). The dialdehyde or acetal is introduced suitably into a pulper or before a pulper into raw water, white water of the process or chemical solutions. The dosage can be effected periodically, e.g. as so-called shock dosage, or continuously as maintenance dosage. To prevent loss of brightness after bleaching, it is advantageous that the process contains so-called residual peroxide. It is thus also useful to introduce a dialdehyde or an acetal after bleaching into dilution water, which may contain a catalase enzyme.

In the following, reference is made to accompanying FIGS. 1 to 6.

DETAILED DESCRIPTION OF THE PREFERRED EMBODIMENTS

Figure 1:
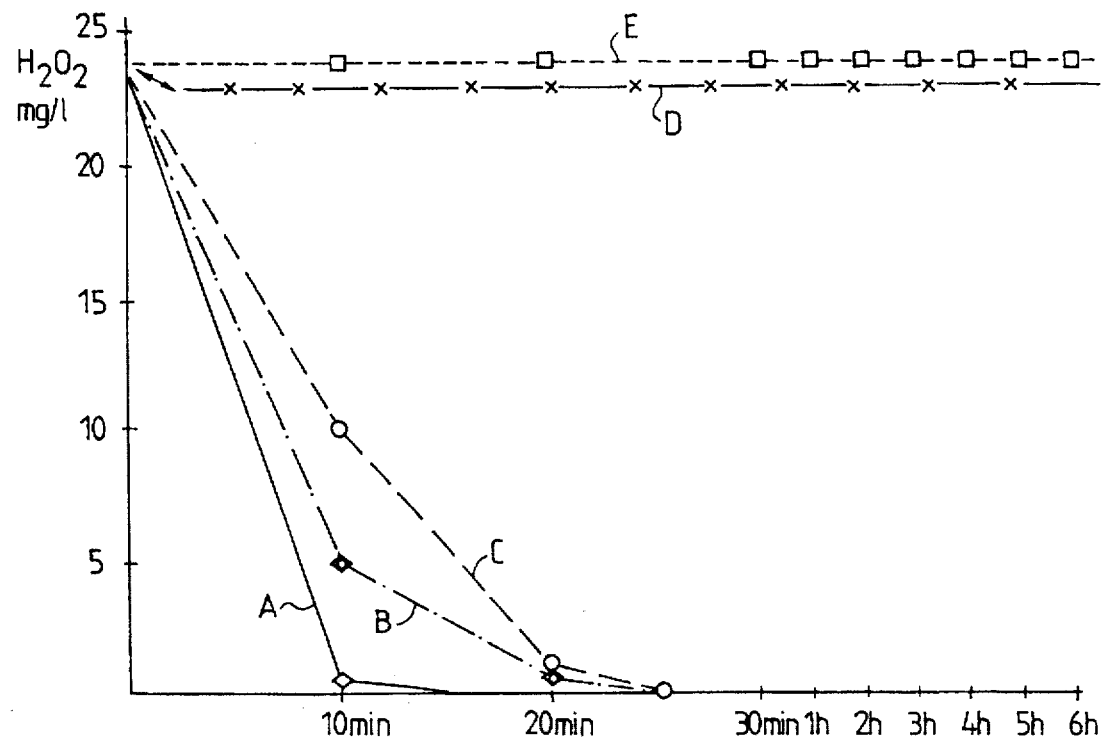
FIG. 1 shows the effect of glutaraldehyde on the residual hydrogen peroxide in process water.
Figure 2:
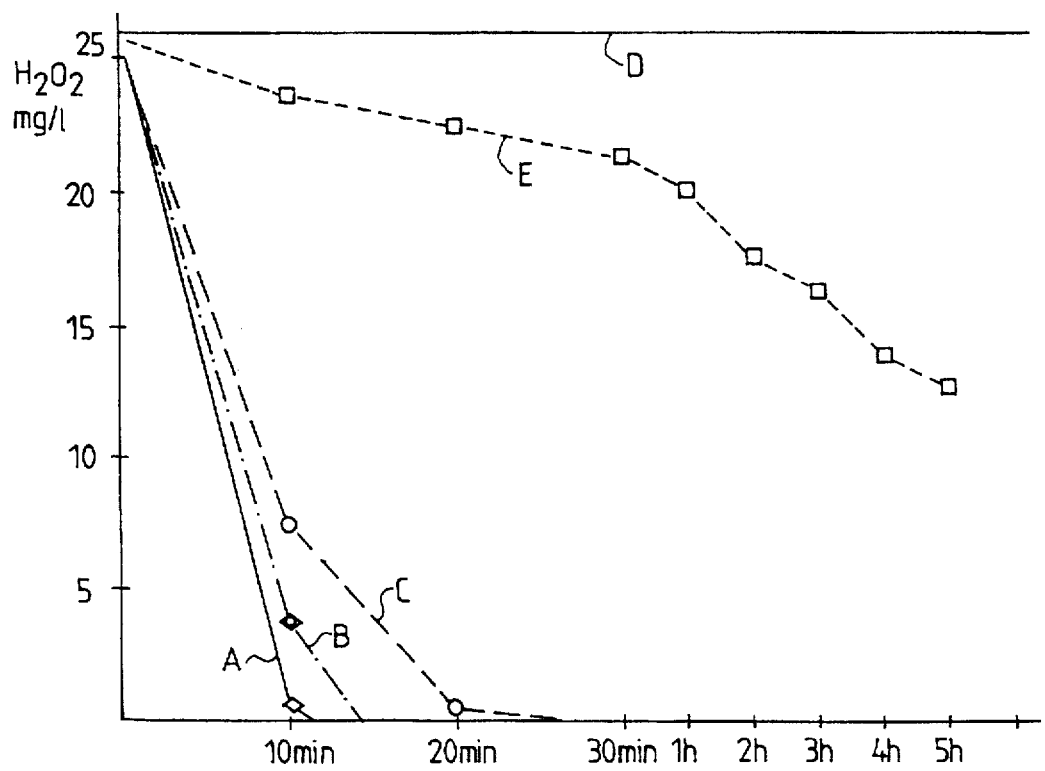
FIG. 2 shows the effect of succinic aldehyde on the residual hydrogen peroxide in process water.
Figure 3:
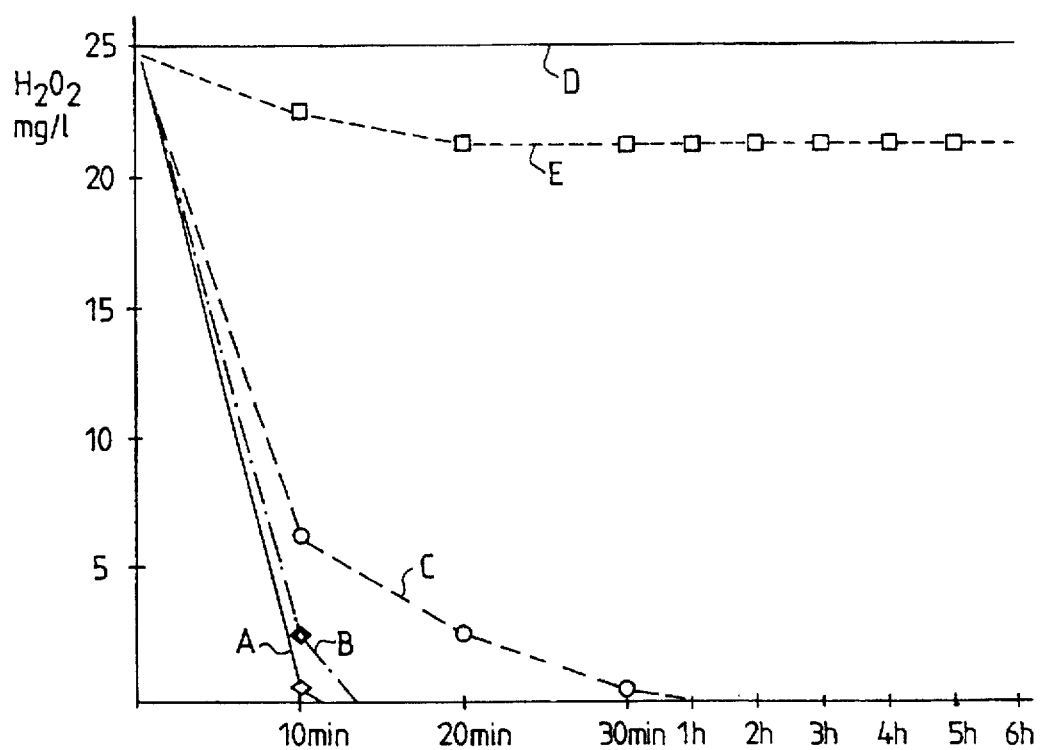
FIG. 3 shows the effect of o-phthalic aldehyde on the residual hydrogen peroxide in process water.
Figure 4:
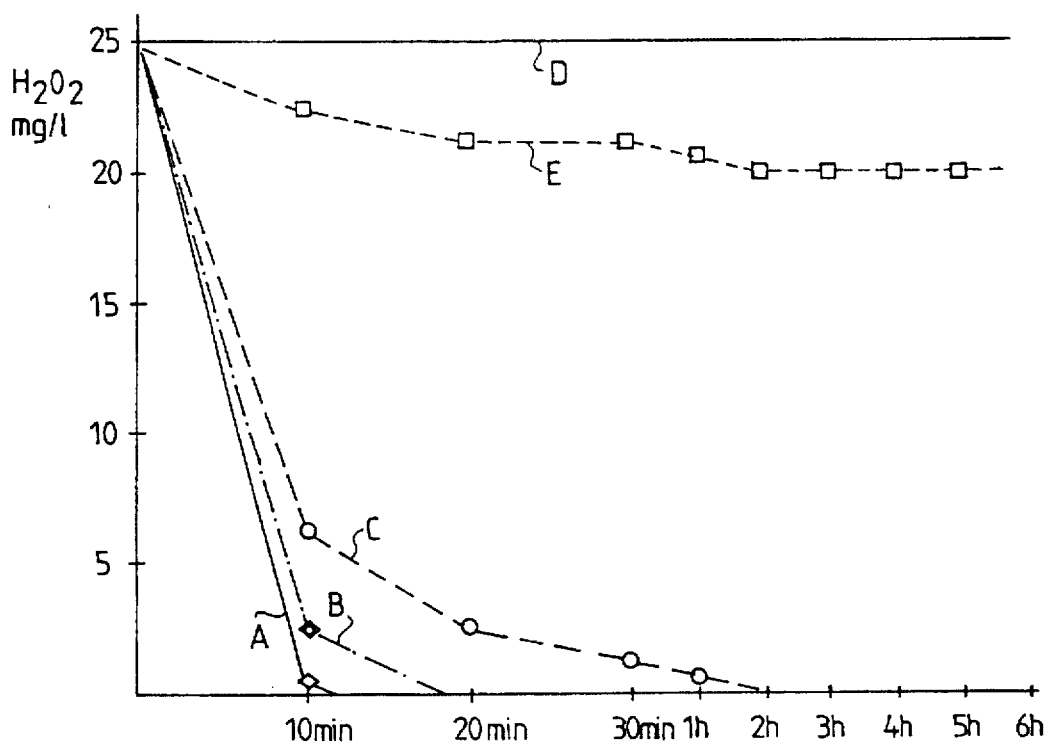
FIG. 4 shows the effect of 2,5-dimethoxytetrahydrofuran on the residual hydrogen peroxide in process water.
Figure 5:
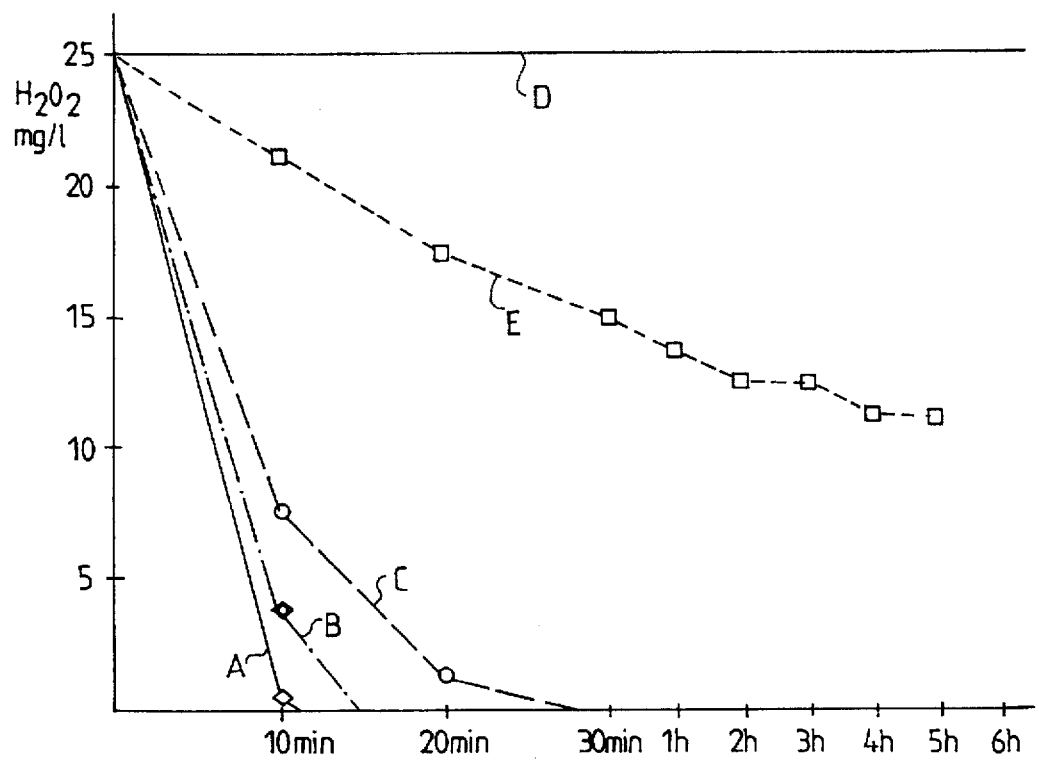
FIG. 5 shows the effect of bis-(2-methoxy-tetrahydropyran-5)-poly(6,8)etheneglycolether on the residual hydrogen peroxide in process water.

FIG. 1 shows the advantageous effect of the use of glutaraldehyde. Curves A to D in the figure illustrate the content of residual hydrogen peroxide (decomposition) as a function of time when the process water used for the production of recycled fiber pulp and a conventional chemical composition used in the production of pulp are used either together with a glutaraldehyde or without it.

Curve A illustrates a case where the following chemical composition was used: NaOH (0.6 g/l), soluble glass (1.6 g/l), $H_2O_2$ (1.1 g/l), and collector chemicals.

Curve D illustrates a case where the chemical composition was the same as in the case of curve A, but the process water had been sterilized and enzymes destroyed by cooking for 20 minutes.

Curve B illustrates a case where the chemical composition was the same as in the case of curve A, but a glutaraldehyde had been introduced into the process water in such an amount that the glutaraldehyde content was 25 ppm based on weight.

Curve C illustrates a case where the chemical composition was the same as in the case of curve A, but a glutaraldehyde had been introduced into the process water in such an amount that the glutaraldehyde content was 50 ppm based on weight.

Curve E illustrates a case where the chemical composition was the same as in the case of curve C, but the glutaraldehyde had been introduced before cooling to the testing temperature.

FIG. 1 shows that the decomposition of peroxide is significantly retarded and even completely inhibited (curves B, C and E) when a glutaraldehyde is used. Positive results are also achieved by sterilizing the process water and destroying the enzymes (curve D), but particularly in large scale, this procedure is laborious and uneconomical.

Figure 6:
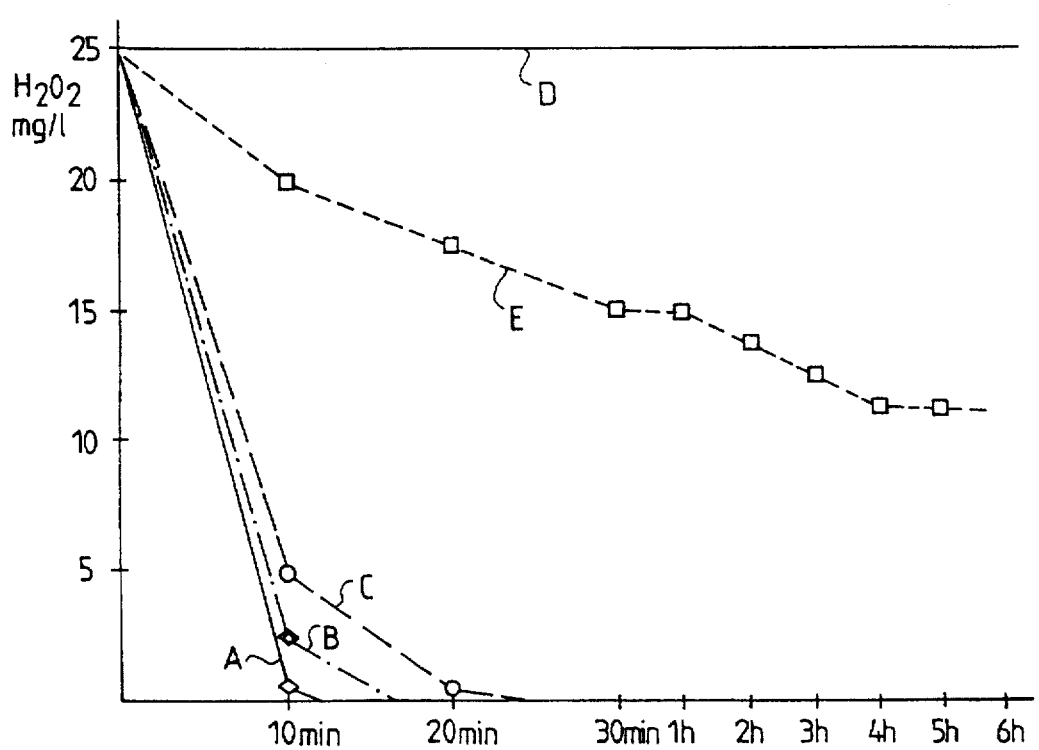
FIG. 6 shows the effect of 2,4-bis(dimethoxymethyl)-2,4-bis(hydroxymethyl)-pentane-1,5-diole on the residual hydrogen peroxide in the process water.

Similar results are also achieved with other dialdehydes and acetals thereof, as appears from FIGS. 2 to 6, where curves A to E correspond to the cases described in connection with FIG. 1 except that the glutaraldehyde was replaced with succinic aldehyde (FIG. 2), o-phthalic aldehyde (FIG. 3), 2,5-dimethoxytetrahydrofuran (FIG. 4), bis-(2-methoxytetrahydropyran-5)-poly(6,8)etheneglycolether (FIG. 5) and 2,4-bis(dimethoxymethyl)-2,4-bis(hydroxymethyl)-pentane-1,5-diole (FIG. 6).

By the use of dialdehydes and acetals thereof in accordance with the invention it is possible to achieve considerable savings on peroxide. Furthermore, the process can be better controlled in order to achieve more even brightness and to reduce yellowing. It is also possible to reduce the use of those stabilizing chemicals which have no effect on the enzymes that decompose peroxide.

We claim:

1. A method of inhibiting enzymatic decomposition of peroxide, comprising producing and treating recycled fiber pulp and other fiber pulp with peroxide, wherein dialdehydes and acetals thereof are included to inhibit enzymatic decomposition of the peroxide and the amount of the dialdehyde or acetal used for the production of recycled fiber pulp or other fiber pulp is 0.05 to 2 kg, per ton of produced fiber pulp, based on dry weight.

2. The method according to claim 1, wherein the dialdehyde is a straight-chain or cyclic dialdehyde which contains 2 to 8 carbon atoms and which may be C-substituted and contain heteroatoms.

3. The method according to claim 2, wherein the dialdehyde is glyoxal, succinic aldehyde, glutaraldehyde, methylglutaraldehyde, octanediale or oxa-glutaraldehyde.

4. The method according to claim 1, wherein the dialdehyde is an aromatic dialdehyde which contains 6 carbon atoms and which may be substituted and contain heteroatoms.

5. The method according to claim 4, wherein the dialdehyde is o-phthalic aldehyde, m-phthalic aldehyde or p-phthalic aldehyde.

6. The method according to claim 1, wherein the acetal is

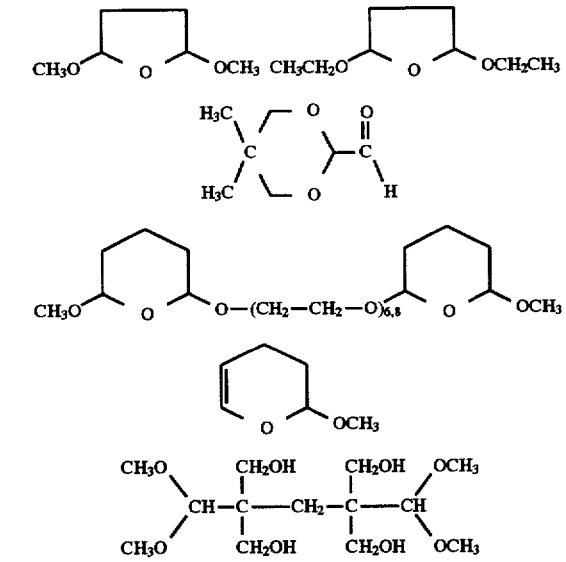

or 1,6-dihydroxy-2,5-dioxahexane.

7. The method according to claim 1, wherein the amount of the dialdehyde or acetal used for the production of recycled fiber pulp or other fiber pulp is 0.1 to 1 kg, per ton of produced fiber pulp, based on dry weight.

8. The method according to claim 7, wherein the amount of the dialdehyde or acetal used for the production of recycled fiber pulp or other fiber pulp is 0.2 to 0.6 kg, per ton of produced fiber pulp, based on dry weight.

9. The method according to claim 1, wherein the dialdehyde or acetal is introduced into process water used for the production of recycled fiber pulp or other fiber pulp.

10. The method according to claim 1, wherein the dialdehyde or acetal is introduced into raw water used for the production of recycled fiber pulp or other fiber pulp.

11. The method according to claim 1, wherein the dialdehyde or acetal is introduced into a pulper used for the production of recycled fiber pulp or other fiber pulp.

12. The method according to claim 1, wherein the dialdehyde or acetal is introduced into chemical solutions used for the production of recycled fiber pulp or other fiber pulp.

* * * * *